Inventors:
William R. Brooks
James V. Moore
By
Gary, Parker, Juettner & Cullinan
Attys

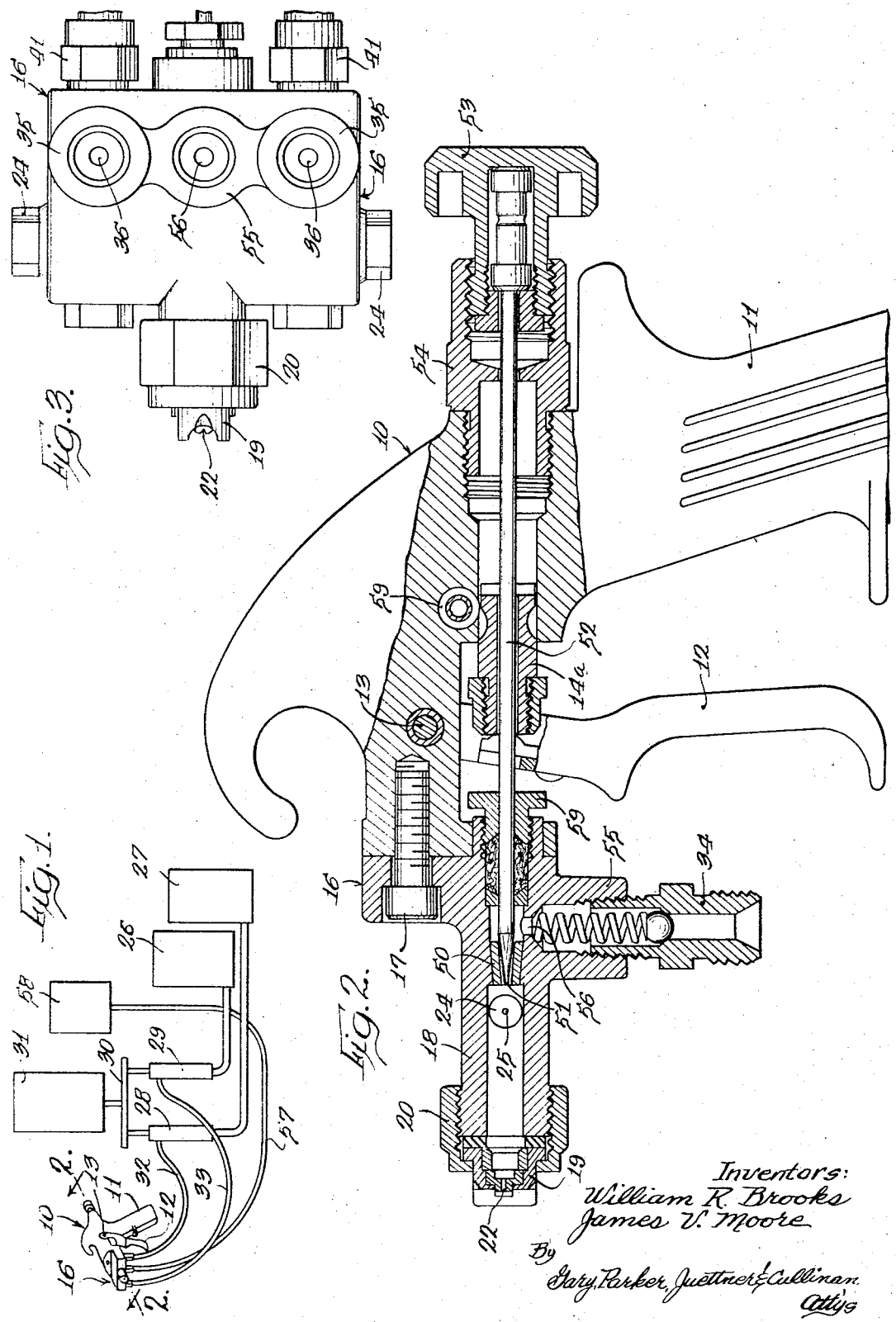

United States Patent Office 3,366,337
Patented Jan. 30, 1968

---

3,366,337
AIRLESS SPRAY GUN USING DIAMETRICALLY OPPOSED IMPINGEMENT ORIFICES
William R. Brooks, Elmhurst, and James V. Moore, Melrose Park, Ill., assignors to Binks Manufacturing Company, Chicago, Ill., a corporation of Delaware
Filed May 27, 1965, Ser. No. 459,327
3 Claims. (Cl. 239—414)

This invention relates to improvements in spray guns, and more particularly to an airless spray gun and the method of spraying therewith two component chemically reactive resin forming materials of the exothermic resin family, especially those which are foam forming.

A characterizing feature of the present invention relates to method and means for intimately mixing and spraying a pair of coreactive chemical streams immediately prior to the situs of application, by impinging jets or streams of said reactants against each other under pressure from opposed directions into the remote end of an endwise open mixing chamber whereby they are discharged therefrom solely under the influence of said pressure and intimately mixed therein and discharged at least in partly reacted form.

A further characterizing feature of the present invention is that this mixing and spraying is accomplished without the aid or necessity for a mechanical agitating or mixing means which might hamper or impede the flow and impingement of the two issuing jets or the resultant reaction mixture, pressure being established solely by an outside source.

As a result of the present invention a better foamed product is produced as a result of better mixing of the reactants and better economics are accomplished as a result of less overspray and bounce-back. The resulting products have a smooth finish and better appearance than heretofore obtainable in that the process and means of spraying entails less chance of trapping moisture.

Moreover, the operator is given a better control of foam thickness and is permitted to go into cracks and corners due to the absence of heretofore conventionally employed compressed air blasts. Moreover, the spray gun is lighter in weight resulting in less operator fatigue; the gun needs a minimum of parts which are easy and cheap to maintain and can operate at about 8 cubic feet per minute with as low as 80 pounds per square inch to run the supply pumps.

Another feature of the present invention is that the spray gun is provided with means for separately introducing a stream of solvent to the discharge or mixing chamber after the gun has been operated and the separate stream discharge ports closed, so that the discharge chamber can be cleaned of residual chemicals or resins prior to further operation.

Other objects and advantages of the present invention, its details of construction, arrangement of parts and the economies and method thereof will be apparent from a consideration of the following specification and accompanying drawings wherein:

FIG. 1 is a diagrammatic illustration of the spray gun and liquid supply sources therefor.

FIG. 2 is a side elevational view of the spray gun of the present invention partly in longitudinal vertical section.

FIG. 3 is a fragmentary bottom view of the head portion of the spray gun of the present invention.

Figure 4:
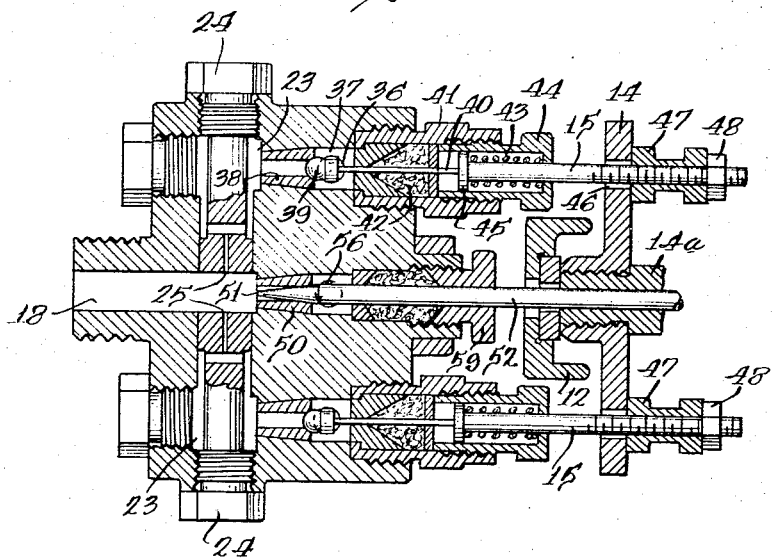
FIG. 4 is a fragmentary longitudinal section taken on a horizontal plane of the head portion of the spray gun of FIG. 2.

Referring to the drawings, the reference numeral 10 indicates a generally conventional spray gun body portion having a handle 11 and a trigger 12 pivoted at 13 on the body 10, the trigger 12 extending from a yoke 14 adapted to jointly actuate the spring pressed valve rods 15–15.

Secured to the body 10 is the head portion generally indicated as 16, bolted at 17 to the body 10. This head portion is formed medially at its forward end with a duct or port 18 defining an axial passage or mixing chamber, the forward or outer end of which may carry the airless spray nozzle 19 secured thereto by the nut 20, the orifice 22 of the nozzle being axially aligned with the duct 18 when employed, and desirably the diameter of orifice 22 is smaller than that of the duct 18.

The head 16 is further formed with an opposed pair of cross-bores or ducts 23—23 disposed normal to the axial duct 18 into which are threaded metering plugs 24—24 having aligned orifices 25—25 opening towards each other and into the rearward or inner end portion of mixing chamber or duct 18. These orifices 25—25 are suitably of a diameter of from about ten to about sixty thousandths of an inch and they desirably should be substantially equal or vary not more than about 10% from each other.

Liquid chemical reactant components are supplied to the impingement orifices 25—25 under a constant uniform pressure of say from about 800 to about 2600 pounds per square inch from the supply containers 26 and 27 by means of suitable pumps such as the conventional high pressure piston pumps 28, 29 tied together as at 30 and in phase, and driven by the air motor 31. The amount of reactants or their proportions can be varied by varying the stroke and thus output of the pumps 28, 29, or in the alternative, different sized pumps can be employed. Control of the amount of reactants or other proportions can also be effected by means of the metering plugs 24—24. Leading from the pumps 28, 29 are the conduits 32, 33 the latter being respectively engaged to the check valve nipples 34, 34 threaded in the body duct portions 35, 35.

From here the liquids separately pass through an orifice 36 into the chamber portion 37 provided with a valve seat 38 seating the valve ball 39 carried on the stem 40 and rod 15, as shown in FIG. 4. The valve stem 40 is engaged in the retainer 41 and packing 42 and is pressed by means of the spring 43 disposed in the gland 44 acting against the flange component 45. The rear or outer free ends of rods 15—15 each pass through an aperture 46 in the yoke 14 whereat they are engaged by the nuts 47, 48 whereby upon pressing the trigger 12 both valve heads 39, 39 are jointly withdrawn permitting liquid from the receptacles 26 and 27 to flow under pressure through the impingement orifices 25, 25 and then become thoroughly mixed for maximum reaction and incipient foam development in chamber 18 and discharged either directly therefrom or through the nozzle 19, the latter not being essential, but employed when it is desirable to produce a spray pattern or for coating surfaces. However, the nozzle is dispensed with when filling spaces with mixed foam.

Although no air is employed in spraying, it has been found that when employing a spray nozzle with the high velocity spray as hereinbefore indicated, there is an "implosion" of atmospheric air at the exit of the nozzle orifice causing an unexpectedly fine celled foam to be formed and deposited.

The spray gun of the present invention is further provided with a third duct arrangement comprising the valve seat 50 terminating in the orifice 51 opening at the axis of the outlet duct 18 and at its rear end, and thus spaced upstream from the impingement orifices 25—25. This is for the purpose of introducing solvent into duct 18 to remove residual chemical deposits therein after termination of the spraying operation previously described.

The valve stem 52 passing through nut 59 and its contained packing, is free of yoke 14 and of control by trigger 12, but rather is manually controlled by the knob 53 threaded into housing 54, in turn threaded into body 10. Rotation of knob 53 upsets the tip of stem 52 from valve seat 50 to permit communication through orifice 56 opening to duct portion 55.

The duct portion 55 has threadedly engaged thereto a check-valve nipple 34, such as previously described engaged to duct portions 35, 35. This medially disposed nipple 34 is connected by means of the conduit 57 to the solvent supply vessel 58 which may be a pressure vessel, or it can be provided with a separate pump, not shown. After cleaning, the tip of valve stem 52 is seated to close orifice 51 before again conducting the spraying operation by means of trigger 12.

When the trigger 12 is pressed, it may if desired be retained in pressed position by inserting a spring pressed trigger locking pin 59 into a matching groove in plunger 14a which comprises part of the yoke 14.

Figure 5:
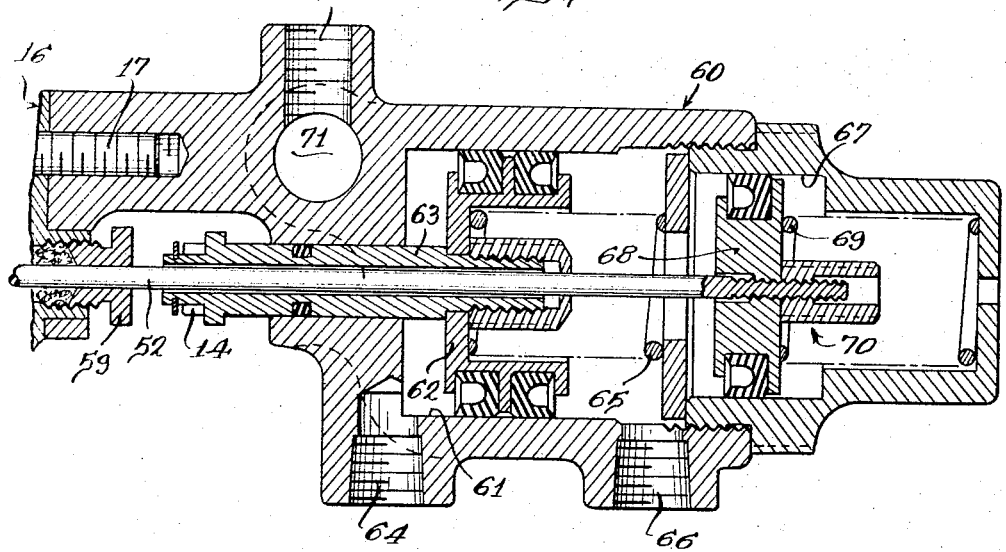
FIG. 5 is a fragmentary longitudinal section taken on a vertical plane of a modified body portion of the spray gun of the present invention illustrating automatic air actuation means employed in lieu of the conventional spring pressed trigger means of FIG. 2.

In lieu of manual operation by means of trigger 12, the valve balls 39, 39 may be upset from their seats and returned by automatic air controlled means as shown in FIG. 5.

Referring to FIG. 5, the gun head illustrated in FIGS. 3 and 4 is shown as attached to an automatic operating mechanism indicated generally at 60 and comprising a first or forward cylinder 61 containing a piston 62 coupled to a tubular stem 63 which extends through the front wall of the cylinder and is connected at its forward end to the yoke 14. Air under pressure may be admitted via the port 64 to drive the piston rearwardly thereby to actuate the yoke 14 to valve opening position. When the air pressure introduced at port 64 is relieved or vented, spring 65 rearwardly of piston 62 will bias the piston and stem forwardly to release the yoke 14 and permit the springs 43 to close the material valves.

When it is desired to flush the gun head, the air is introduced via port 66 to the rearward side of the piston 62. Communicating with the area rearwardly of the piston 62 is a second or rearward cylinder 67 containing a piston 68 which is connected to the solvent needle valve 52, so that air under pressure admitted via port 66 will force the piston 68 rearwardly thereby to open the solvent needle valve. When air pressure at port 66 is relieved or vented, spring 69 rearwardly of the piston will return the piston in the forward direction thereby to seat the needle valve and cut off the flow of solvent. To insure proper seating of the needle valve, a screw-threaded adjustable connection indicated generally at 70, is preferably provided between the piston 68 and the needle.

As is customary, the automatic operator 60 includes mounting rod and set screw passages 71 and 72 to facilitate mounting of the same in operative position in automatic spraying installation.

The components to be sprayed should desirably be of low viscosity such as approximately 500 centipoises and although not shown, for such purpose, means may be provided to heat one or both components to bring them to desired viscosity.

For the production of urethane foams, one of the streams can be an isocyanate type of material such as toluene diisocyanate and the other stream a hydroxyl reacting stream such as a polyether or polyester resin.

For the production of urethane resins as distinguished from foams, for the production of coatings, one of the streams may be composed of isocyanate and the other of polyether or polyester resin, with optional inclusion of a catalyst and pigment. Therefore, in production of epoxide resins, one of the streams may be composed of a polyamide or a polysulfide and the other Bisphenol A.

For the production of unsaturated polyester base resins, the resin is split into two streams, one being a batch of the resin with a catalyst such as methyl ethyl ketone peroxide and the other resin with accelerator such as cobalt naphthonate.

Other urethane resin foams can be formed of the following reactants:

(1) Isocyanates such as toluene diisocyanate, methylene bis-(4-phenyl isocyanate) and polymethylene polyphenyl isocyanate.

(2) Polyether resins including sucrose, sorbitol, methyl glucoside and poly glycol ether.

(3) Catalysts such as amines and tins.

(4) Blowing agents such as fluorocarbons i.e. trichloromonfluoromethane and/or water.

(5) Silicone-surfactants.

These can be employed by two basic methods:

(1) The so-called "one shot" method, where we have one of the basic Isocyanates of component 1 and feed this as one stream and the other components of 2, 3, 4 and 5 placed together to be fed as the other stream.

(2) The so-called quasi partial, or complete prepolymer method where part or all of component 2 is partially reacted with one of the Isocyanates of component 1 and fed as one stream and then, in the case of the complete prepolymer component 3, 4, 5 become the second stream. In the case of the more common quasi or partial prepolymer only part of the component 2 is partially reacted with one of the Isocyanates of component 1 and fed as one stream. The balance of component 2 is placed together with component 3, 4 and 5 to comprise the second stream.

Although we have shown and described the preferred embodiment of our invention it will be understood by those skilled in the art that changes may be made in the details thereof without departing from its scope as comprehended by the following claims.

We claim:

1. An airless spray gun formed with a discharge duct defining a mixing chamber and having inner and outer ends, a pair of inlet ducts disposed normally to said discharge duct and terminating in diametrically opposed coplanar impingement orifices opening to an inner end portion of said discharge duct, jointly operable valve means for simultaneously introducing streams of reactant liquid at high velocity through said opposed orifices to said discharge duct and means for introducing said reactant streams under hydraulic pressure as the sole agency for mixing and discharging said streams in the form of their reaction product, said spray gun further including a cleaning duct opening to the inner end of and coaxial with said discharge duct, valve means for controlling said cleaning duct separate from the said other valve means, and means for introducing cleaning liquid thereto under separate pressure.

2. The spray gun of claim 1 including a nozzle at the outer end of said discharge duct having an orifice of smaller diameter than that of said duct.

3. The spray gun of claim 1 further including metering means in said pair of inlet ducts.

References Cited

UNITED STATES PATENTS

| 1,774,694 | 9/1930 | Bateman | 239—414 |
| 2,356,865 | 8/1944 | Mason | 239—414 |
| 2,724,615 | 11/1955 | Ariotti | 239—428 X |
| 2,970,773 | 2/1961 | Kerylok et al. | 239—414 X |
| 3,116,878 | 1/1964 | Reiter | 239—142 |
| 3,123,306 | 3/1964 | Bradley | 239—428 X |
| 3,179,341 | 4/1965 | Plos et al. | 239—414 |
| 3,263,928 | 8/1966 | Gusmer | 239—142 X |
| 3,330,484 | 7/1967 | Johnson et al. | 239—142 X |

M. HENSON WOOD, JR., *Primary Examiner.*

V. C. WILKS, *Assistant Examiner.*